Figure 1:
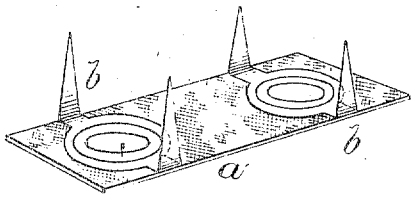

D. C. VOSS.

GARMENT MARKER FOR LAUNDRIES AND THE LIKE.

APPLICATION FILED DEC. 9, 1907.

Reissued July 5, 1910. 13,126.

Witnesses:
H. A. Eichorn
M. M. Harrington

Inventor
Detlef C. Voss
By Henry J. Miller
Attorney.

UNITED STATES PATENT OFFICE.

DETLEF C. VOSS, OF SOMERVILLE, MASSACHUSETTS, ASSIGNOR, BY MESNE ASSIGNMENTS, TO WALTER L. HENDRICKS, OF BOSTON, MASSACHUSETTS.

GARMENT-MARKER FOR LAUNDRIES AND THE LIKE.

13,126. Specification of Reissued Letters Patent. Reissued July 5, 1910.

Original No. 808,788, dated January 2, 1906, Serial No. 257,847. Application for reissue filed December 9, 1907. Serial No. 405,835.

*To all whom it may concern:*

Be it known that I, DETLEF C. VOSS, a citizen of the United States, residing at Somerville, in the county of Suffolk and State of Massachusetts, have invented an Improvement in Garment-Markers for Laundries and the Like, of which the following description, in connection with the accompanying drawings, is a specification, like characters on the drawings representing like parts.

My invention has for its object the provision of a permanent label or marking band or device for laundry work. At present it is the common custom to mark articles for the laundry simply by tying a strip of cloth to the article or marking the article itself with a pen, and in some instances a cloth-covered metal prong is bent around or clasped into the garment. These devices however, either deface the article or have to be removed after each washing.

Accordingly my invention aims to provide a marking device which shall remain permanently attached to the article without disfiguring or injuring the same and without causing any inconvenience to the user.

One object of the invention is to so construct a flexible strip, to receive the identifying name or number, that said strip may be attached to the garment to be identified by simple mechanical means which will not be liable to become detached from said strip.

I provide a special strip of bias fabric secured together in a special manner, as hereinafter described, and provided at its opposite ends with prong-carrying eyelets composed of pliable material not liable to rust.

In the drawings I have shown a preferred embodiment of my invention, and said invention will be more fully explained in the course of the following description and further defined in the appended claims.

Figure 3:
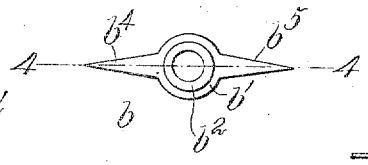
Figure 2:
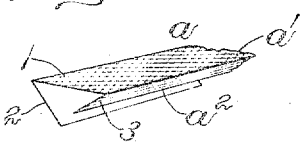
Figure 4:
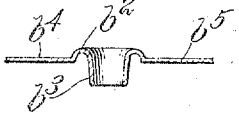
Figure 5:
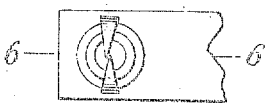
Figure 6:
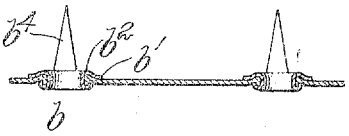

In the drawings, Figure 1 is a perspective under side view greatly enlarged of the laundry attachment which constitutes my invention. Fig. 2, is a perspective view illustrating the peculiarities of the strip or foundation portion of the device. Fig. 3 is a plan view of one of the eyelets before being put in position. Fig. 4 is a longitudinal sectional view thereof on the line 4—4, Fig. 3. Fig. 5 is a bottom plan view of one end of the device, illustrating its manner of use. Fig. 6 is a longitudinal sectional view taken on the line 6, Fig. 5, showing the prongs or tangs in position for affixing an article; and Fig. 7, is a sectional view showing the operation of the attachment in practical use.

For the purpose in question it is necessary that the device shall be extremely pliable, so that it can be left in the garment as, for example, without incommoding the user and shall be capable of a large amount of ill-treatment without material injury (permitting it, for example, to pass repeatedly through a mangle) and shall be durable as well as inexpensive, (so that it may be economically substituted for the simple hand-marking) and simple to attach and smooth and permanent in shape, so as readily to receive the marking.

I have succeeded in securing all the above results in one article by providing a specially formed strip $a$ of cloth in connection with peculiarly formed and combined fasteners $b$. The cloth is cut on a bias, that is to say, the threads of the cloth are inclined to the edges of the latter as indicated at $a'$, and is then creased to make three folds, as indicated at 1, 2, 3, Fig. 2, rubber-cement $a^2$ being applied to one or more of said folds, whereupon they are passed between rollers, which operate to permanently cement the strip and smooth it out, pressing the cement into the fabric and rendering the outer surface smooth to receive writing. The strip is cut into suitable length, (the actual size being about one and one-fourth inches long by three-eighths of an inch wide,) and then the fasteners are applied at the opposite ends. These fasteners must necessarily be small (being in practice about one-fourth of an inch in diameter) and are made of extremely-pliable material, such as zinc, and their general construction should be such that they may be secured in the end portions of the bias material the diagonal threads of which hold them in place. Many forms of fasteners may be advantageously employed and I have found that it is possible to make a practical fastener of this size and secure it in the peculiar strip in such manner that the cloth will not pull out under the severe mangling and usage in the laundry and elsewhere by providing a fastening of the shape shown in Figs. 3 and 4, where it will be seen that it comprises an approximately flat outer edge $b'$, verging into a raised or outwardly-curved bend $b^2$, (shown best in Fig. 4,) and thence converging into a tubular part $b^3$. At its opposite sides the flat rim $b'$ is provided with prongs $b^4$ $b^5$, which are subsequently bent at right angles to the eyelet, as shown in Fig. 1, being bent slightly out of parallelism, so that when forced down they will not interfere. (See Fig. 5.) Having provided eyelets of the kind shown, the free end of the tubular portion $b^3$ is upset or curved outwardly and back into biting engagement with the edge of the cloth, so as to pinch the latter into crimped or interlocked position in the curved bend or pocket $b^2$, as shown clearly in Figs 6 and 7. This construction cooperates with the bias strip to hold the cloth tenaciously and yet occupy little space and does not interfere with the free flexibility of the marking device and provides the desired central opening for the purpose presently to be described.

Figure 7:
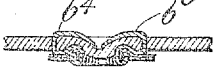

In use the device is applied to the desired part of the garment which is to be marked, the prongs $b^4$ $b^5$ being forced through the material, and they are then bent over toward each other into the position shown in Fig. 5, and their free ends and the included material are pressed inwardly into said central opening, as shown in Fig. 7. The result is that the marking device is firmly secured, so that it will pass repeatedly through the mangle or other machine and will be permanently retained practically as long as the garment lasts, while at the same time presenting a smooth neat appearance without any tendency to get caught or become disturbed and with little liability to injure the garment, even though the latter be delicate.

Except as required by the scope of the appended claims, I do not limit myself to the specific manner of folding the bias fabric as shown or described herein, nor do I wish to limit my invention to the particular means for securing said strip to a garment.

Having described my invention, what I claim as new, and desire to secure by Letters Patent of the United States, is—

1. A garment marker, comprising a flexible strip of woven fabric, having at its opposite ends eyelets permanently secured thereto, and provided with securing prongs or clamps for piercing the fabric and being bent back into the holes of the eyelets.

3. A garment marker, comprising a flexible strip of woven fabric cut on the bias comprising a plurality of folds secured to each other, having at its opposite ends eyelets permanently secured thereto and provided with securing prongs or clamps for piercing the fabric and being bent back into the holes of the eyelets.

3. A garment marker, comprising a flexible strip of woven fabric cut on the bias and comprising a plurality of folds secured to each other by a waterproof cement, having at its opposite ends eyelets permanently secured thereto, and provided with securing prongs or clamps for piercing the fabric and being bent back into the holes of the eyelets.

4. A garment marker comprising a multifolded bias strip cemented with waterproof cement, and having at each end a prong-carrying eyelet, said eyelet having an outwardly curved annular pocket at one end of its central hole, and a rolled over edge at the opposite end of said central hole, said edge inclosing the material and pinching the same into said pocket.

5. A garment marker, comprising a cloth portion for receiving the writing or laundrymark, and an eyelet provided with opposite prongs, said eyelet having a flat peripheral rim, an out turned annular pocket adjacent thereto, converging into a central tubular portion terminating at the opposite side in a rolled over edge, said edge interlocking with the cloth and pinching the same into said annular pocket.

6. A laundry or equivalent marker comprising a bias mark-receiving strip provided with a fastener having prongs adapted to penetrate the article to be marked and to be bent down toward the reverse face of said strip, said fastener being secured to said bias strip at one end of the latter by a portion thereof extended through said strip thereby to obtain the combined resistance upon said securing portion of intersecting diagonal threads to resist pulling out of said fastener.

DETLEF C. VOSS

Witnesses:
G. F. LEAKER,
L. H. HARRINGTON.